(12) United States Patent
Hoffmann et al.

(10) Patent No.: US 11,924,715 B2
(45) Date of Patent: Mar. 5, 2024

(54) EDGE APPLICATION SERVER ASSIGNMENT FOR AD-HOC GROUPS OF USER EQUIPMENT

(71) Applicant: NOKIA SOLUTIONS AND NETWORKS OY, Espoo (FI)

(72) Inventors: Klaus Hoffmann, Munich (DE); Laurent Thiebaut, Antony (FR); Bruno Landais, Pleumeur-Bodou (FR); Shubhranshu Singh, Seeheim-Jugenheim (DE); Georgios Gkellas, Petroupoli (GR)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 17/738,052

(22) Filed: May 6, 2022

(65) Prior Publication Data

US 2023/0362598 A1    Nov. 9, 2023

(51) Int. Cl.
*H04L 12/24* (2006.01)
*H04L 29/12* (2006.01)
*H04L 41/0893* (2022.01)
*H04L 61/4511* (2022.01)
*H04L 61/5069* (2022.01)
*H04W 4/08* (2009.01)
*H04L 101/365* (2022.01)
*H04W 84/18* (2009.01)

(52) U.S. Cl.
CPC .......... *H04W 4/08* (2013.01); *H04L 41/0893* (2013.01); *H04L 61/4511* (2022.05); *H04L 61/5069* (2022.05); *H04L 2101/365* (2022.05); *H04W 84/18* (2013.01)

(58) Field of Classification Search
CPC ....... H04L 41/00; H04L 41/04; H04L 41/052; H04L 41/08; H04L 41/0803; H04L 41/0893; H04W 4/00; H04W 4/06; H04W 4/08
See application file for complete search history.

(56) References Cited

U.S. PATENT DOCUMENTS

| 11,533,594 B2 * | 12/2022 | Purkayastha | ......... H04W 76/12 |
| 2022/0263788 A1 * | 8/2022 | Lee | ..................... H04L 61/4541 |

FOREIGN PATENT DOCUMENTS

WO    2021/099923 A1    5/2021

OTHER PUBLICATIONS

3rd Generation Partnership Project; Technical Specification Group Services and System Aspects; 5G System Enhancements for Edge Computing; Phase 2 (Release 18), 3GPP TR 23.700-48, V0.1.0, Feb. 2022.

(Continued)

*Primary Examiner* — Boris D Grijalva Lobos
(74) *Attorney, Agent, or Firm* — SQUIRE PATTON BOGGS (US) LLP

(57) ABSTRACT

Systems, methods, apparatuses, and computer program products for the assignment of a common edge application server (EAS) for ad-hoc groups of user equipment (UE). A method may include generating or updating binding information comprising a correlation between a group identifier of an ad-hoc group of user equipment (UE) and an edge application server (EAS) identifier assigned to the ad-hoc group, and storing, updating, and/or deleting the binding information, or causing the binding information to be stored, in a database.

26 Claims, 6 Drawing Sheets

(56) References Cited

OTHER PUBLICATIONS

3rd Generation Partnership Project; Technical Specification Group Services and System Aspects; 5G System Enhancements for Edge Computing; Stage 2 (Release 17), 3GPP TR 23.548, V17.2.0, Mar. 2022.
3rd Generation Partnership Project; Technical Specification Group Services and System Aspects; Procedures for the 5G System (5GS); Stage 2 (Release 17), 3GPP TR 23.502, V17.2.0, Sep. 2021.
Extended European Search Report dated Oct. 6, 2023 corresponding to European Patent Application No. 23172016.0.
3GPP TR 23.700-48 V0.2.0 (Apr. 2022), Technical Report, 3rd Generation Partnership Project; Technical Specification Group Services and System Aspects; 5G System Enhancements for Edge Computing; Phase 2 (Release 18), Apr. 1, 2022, pp. 1-82, XP093086649.
Nokia et al., "Solution #37 Updates," 3GPP Draft; S2-2207748, SA WG2 Meeting #152e, Aug. 17-26, 2022; Elbonia, Aug. 30, 2022, XP052207090.
Communication pursuant to Rule 69 EPC—reminder concerning payment of the designation fee (Art. 79(2) EPC) and of the examination fee (Art. 94(1) EPC)—and invitation pursuant to Rule 70a(1) EPC dated Nov. 13, 2023.

* cited by examiner

EDGE APPLICATION SERVER ASSIGNMENT FOR AD-HOC GROUPS OF USER EQUIPMENT

FIELD

Some example embodiments may generally relate to communications including mobile or wireless telecommunication systems, such as Long Term Evolution (LTE) or fifth generation (5G) radio access technology or new radio (NR) access technology or 5G beyond (e.g., 6G) access technology, or other communications systems. For example, certain example embodiments may generally relate to systems and/or methods for edge application server (EAS) assignment for ad-hoc groups of user equipment (UE).

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology, 5G beyond and/or sixth generation (6G) radio access technology. 5G wireless systems refer to the next generation (NG) of radio systems and network architecture. A 5G system may be mostly built on a 5G new radio (NR), but a 5G (or NG) network can also build on the E-UTRA radio. It is estimated that NR provides bitrates on the order of 10-20 Gbit/s or higher, and can support at least service categories such as enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. The next generation radio access network (NG-RAN) represents the RAN for 5G, which can provide both NR and LTE (and LTE-Advanced) radio accesses. It is noted that, in 5G, the nodes that can provide radio access functionality to a user equipment (i.e., similar to the Node B, NB, in UTRAN or the evolved NB, eNB, in LTE) may be named next-generation NB (gNB) when built on NR radio and may be named next-generation eNB (NG-eNB) when built on E-UTRA radio. 5G beyond or 6G is expected to support further use cases beyond current mobile use scenarios, such as virtual and augmented reality, artificial intelligence, instant communications, improved support of IoT, etc.

SUMMARY

An embodiment may be directed to an apparatus including at least one processor and at least one memory comprising computer program code. The at least one memory and computer program code may be configured, with the at least one processor, to cause the apparatus at least to generate, update, and/or delete binding information comprising a correlation between a group identifier of an ad-hoc group of user equipment (UE) and an edge application server (EAS) identifier assigned to the ad-hoc group, to store the binding information in a database, and to subscribe to the database to receive notifications when there is a modification of the binding information.

An embodiment may be directed to an apparatus including at least one processor and at least one memory comprising computer program code. The at least one memory and computer program code may be configured, with the at least one processor, to cause the apparatus at least to store binding information, received from a network node, comprising a correlation between a group identifier of an ad-hoc group of user equipment (UE) and an edge application server (EAS) identifier assigned to the ad-hoc group and fully qualified domain name (FQDN). The apparatus may be further caused to receive, from the network node or another network node, a request to subscribe to receive notifications from the apparatus when there is a modification of the binding information.

An embodiment may be directed to an apparatus including at least one processor and at least one memory comprising computer program code. The at least one memory and computer program code may be configured, with the at least one processor, to cause the apparatus at least to receive, for example from a session management function (SMF), an edge application server (EAS) identifier of an edge application server assigned to an ad-hoc group of user equipment (UE), and to receive, from the session management function (SMF), instructions to send a domain name system (DNS) response comprising the edge application server (EAS) identifier to at least one user equipment in the ad-hoc group of user equipment (UE).

An embodiment may be directed to a method including generating, updating, and/or deleting binding information comprising a correlation between a group identifier of an ad-hoc group of user equipment (UE) and an edge application server (EAS) identifier assigned to the ad-hoc group, storing the binding information in a database, and subscribing to the database to receive notifications when there is a modification of the binding information.

An embodiment may be directed to a method including storing, e.g. by a database, UDM/UDR, binding information received from a network node. The binding information may include a correlation between a group identifier of an ad-hoc group of user equipment (UE) and an edge application server (EAS) identifier assigned to the ad-hoc group and fully qualified domain name (FQDN). The method may also include receiving, from the network node or another network node, a request to subscribe to receive notifications, from the database or UDM/UDR, when there is a modification of the binding information.

An embodiment may be directed to a method including receiving, e.g., from a session management function (SMF), an edge application server (EAS) identifier of an edge application server assigned to an ad-hoc group of user equipment (UE), and receiving, from the session management function (SMF), instructions to send a domain name system (DNS) response comprising the edge application server (EAS) identifier to at least one user equipment of the ad-hoc group of user equipment (UE).

An embodiment may be directed to an apparatus including means for generating, updating, and/or deleting binding information comprising a correlation between a group identifier of an ad-hoc group of user equipment (UE) and an edge application server (EAS) identifier assigned to the ad-hoc group, means for storing the binding information in a database, and means for subscribing to the database to receive notifications when there is a modification of the binding information.

An embodiment may be directed to an apparatus including means for storing binding information, received from a network node, comprising a correlation between a group identifier of an ad-hoc group of user equipment (UE) and an edge application server (EAS) identifier assigned to the ad-hoc group and fully qualified domain name (FQDN). The apparatus may also include means for receiving, from the network node or another network node, a request to subscribe to receive notifications from the apparatus when there is a modification of the binding information.

An embodiment may be directed to an apparatus including means for receiving, for example from a session management function (SMF), an edge application server (EAS) identifier of an edge application server assigned to an ad-hoc group of user equipment (UE), and means for receiving, from the session management function (SMF), instructions to send a domain name system (DNS) response comprising the edge application server (EAS) identifier to at least one user equipment in the ad-hoc group of user equipment (UE).

BRIEF DESCRIPTION OF THE DRAWINGS

For proper understanding of example embodiments, reference should be made to the accompanying drawings, wherein.

DETAILED DESCRIPTION

Figure 1:
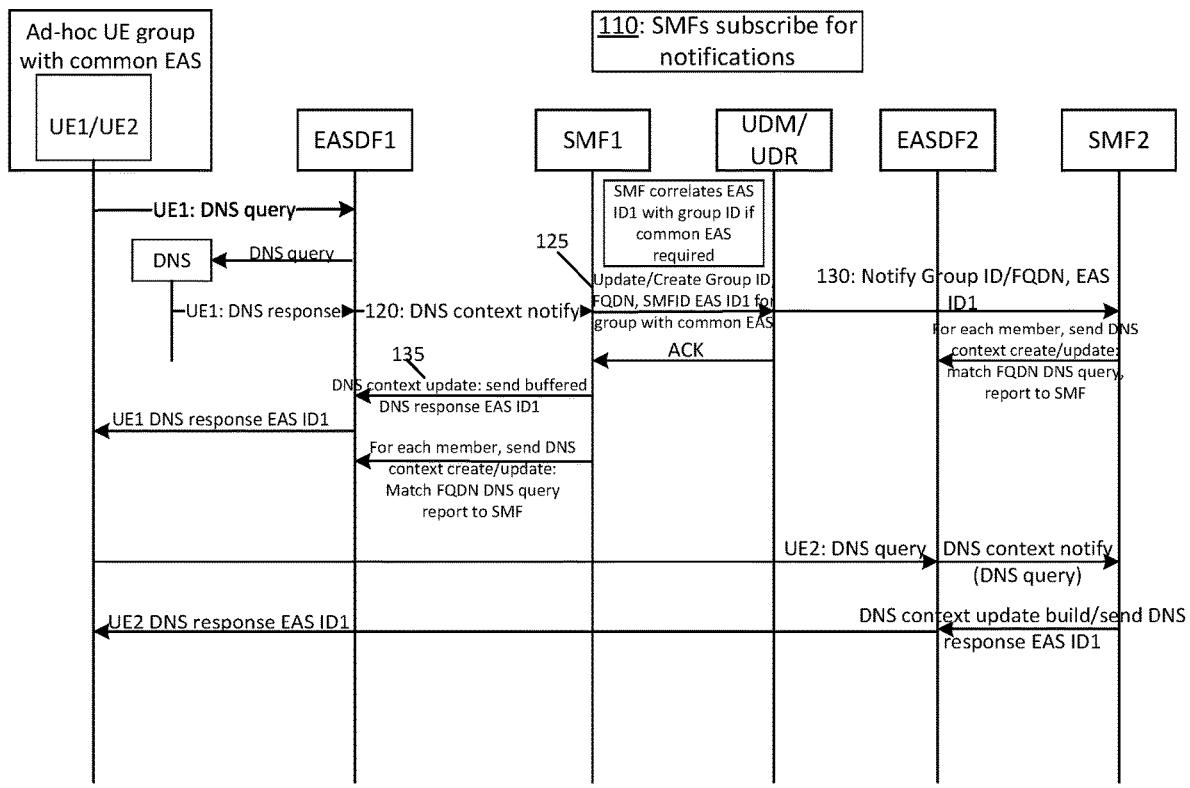
FIG. 1 illustrates an example signaling diagram, according to an embodiment.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for the assignment of a common EAS for an ad-hoc group of UE, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

Certain example embodiments may generally relate to 5G system enhancements for edge computing. Edge computing may enable operator and third party services to be hosted close to the UE's access point of attachment, so as to achieve an efficient service delivery through reduced end-to-end latency and load on the transport network.

Application functions (AF) can provide traffic influence information to the $5^{th}$ generation core network (5GC) in which the AF may indicate a particular UE or a group of UEs. However, this UE group refers to a well-defined and static subscription-based group. For example, the group of UEs can be identified by an external group identifier (ID) when the AF interacts via a network exposure function (NEF) or an internal group identifier when the AF interacts directly with a policy control function (PCF) (e.g., see 3GPP TS 23.501 and TS 23.682).

When an AF request targets any UE or a group of UEs, the AF request is likely to influence multiple protocol data unit (PDU) sessions, possibly served by multiple session management functions (SMFs) and PCFs. When the AF request targets a group of UEs, it provides one or several group identifiers in its request. The group identifiers provided by the AF are mapped to internal group identifiers. Members of the group have this group identifier in their subscription. The internal group identifier can be stored in unified data management (UDM), retrieved by a SMF from UDM and passed by the SMF to a PCF at PDU session set-up. The PCF can then map the AF requests with user subscription and determine whether an AF request targeting a group of UEs applies to a PDU Session.

Certain deployments and use cases, such as time sensitive networks (TSN), platooning and multi-user gaming may require supporting the dynamic and ad hoc creation and management of a collection of UEs handled collectively. Some of these deployments have a need for the dynamic management of the multiple UEs' application-clients that are registered to a particular edge application server (EAS) or gaming server with specific user ID and/or app ID, etc. Due to UE mobility, server load balancing, maintenance and so on, there may be a need for simultaneous offloading of a specific collection of UEs to local EAS/AF, for the dynamic provision of member UEs information to the 5GC and edge hosting environment, and for PDU session anchor (PSA)-user plane function (UPF) relocation for the collection of UEs.

The assignment of common EAS for ad-hoc groups of UE is explicitly known to the SMF. However, a problem arises regarding how to influence the UPF and EAS (re)location for collections or groups of UEs. In particular, it may be advantageous to be able to determine whether and how to define a collection of UEs forming a dynamic ad-hoc group that should use the same EAS, the same local part of a data network (DN), and/or the same data network access identifier (DNAI), as well as how such a collection of UEs is identified.

In view of at least the issues noted above, certain example embodiments are able to ensure that the same EAS is assigned to the member UEs of a dynamically defined ad-hoc group of UEs. For example, in some embodiments, SMF(s) may organize a mapping of the respective EAS ID to the group ID of the ad-hoc UE group. The group ID of the ad-hoc UE group may be stored in a database. According to an embodiment, an EAS may be assigned to the first session of any UE that is a member of that ad-hoc group, and the initial SMF serving the PDU session associated with the ad-hoc UE group may store the respective mapping in the database, such as unified data management (UDM)/unified data repository (UDR). Then, according to an embodiment, for later PDU sessions associated with another UE belonging to that ad-hoc group, that same EAS is used.

According to an embodiment, UE groups that require the handling described in this disclosure, which may be referred to as "groups for common EAS", may be associated with an attribute (which may be referred to as "group for common EAS" for fully qualified domain name (FQDN)) in group data guiding the SMF to follow the behavior described herein. In an embodiment, when SMF(s) serve a protocol data unit (PDU) session associated with a "group for common EAS" indication, the SMF(s) may subscribe to a database, e.g., unified data management (UDM)/unified data repository (UDR) for the mapping between the group ID, FQDN or FQDN range and an EAS instance. If no SMF is associated with the group, the SMF(s) may detect a UE request from a UE member of the "group for common EAS" targeting the FQDN and may determine to act as the SMF for the group, and may also add the EAS ID if not already included in the binding.

After receiving, as part of existing EAS discovery procedure (e.g., as defined in 3GPP technical specification (TS) 23.548), a domain name system (DNS) context notify message from the EAS discovery function (EASDF) for an initial DNS response for a UE of the group, the initial SMF may store the binding between the EAS ID reported by the EASDF, the group ID to which the UE belongs, the FQDN (for which the binding applies) and the SMF ID (and/or SMF set ID). The SMF may report the binding in a local and/or an external database, such as the UDM/UDR. In some embodiments, the database (e.g., UDM/UDR) may notify the binding information between the group ID and an EAS instance to the SMFs that had subscribed to be notified about any change of this binding information. In one example, the EAS ID may take the form of an internet protocol (IP) address. This approach may be applicable, for example, when different SMF sets can handle the same group.

According to a further embodiment, the involved SMF(s) (i.e., initial SMF and SMF(s) having received the mapping notification from the (external) database) can ensure that the DNS requests targeting the same FQDN from their UE provide, as output, the same EAS ID (determined as part of the initial DNS response for a UE of the group for the initial SMF and received in the mapping notification for the other SMF(s)). This may be done by instructing the EASDF to answer to the DNS requests from UE(s) members of the group and targeting the FQDN with the EAS ID.

According to certain embodiments, as will be discussed below with reference to FIGS. 1-4, a SMF may be configured to create, modify and/or delete the binding or correlation of an EAS ID with a group ID for an ad-hoc group and the FQDN for which the binding applies. The SMF may be configured to store the binding information at a local or external database (e.g., UDM/UDR). The binding information may include an FQDN for which the binding exists and/or the SMF ID (and/or SMF set ID). In an embodiment, the SMF(s) may subscribe to the database (e.g., UDM/UDR) for notification of a change of creation, deletion or modification of the correlation of the EAS ID with the group ID.

According to some embodiments, the SMF may provide the EAS ID or EAS address(es) to the EASDF and can instruct the EASDF to generate a DNS response including the EAS IP address(es) towards a UE from buffered DNS query from that UE. Alternatively or additionally, the SMF may generate the DNS response including the EAS IP address and can instruct the EASDF to forward the DNS response to the UE.

Alternatively or additionally, the SMF may instruct the EASDF to report a DNS Query received from any member of the group. The SMF may create a single DNS context for the group of UEs, providing the UE IP addresses of the group members, or instead may create a DNS context for each member of the group referring to a baseline DNS pattern created for the group. In the latter case, the baseline DNS pattern may contain the instruction to build a DNS response with the IP address of the EAS selected for the group from the buffered DNS request without sending the buffered DNS request to the DNS server.

In some embodiments, a database, such as UDM/UDR may be configured to accept new creation, deletion and/or modification of the correlation of an EAS ID with group ID for the ad-hoc group of UEs and may be configured to store the correlation information. According to an embodiment, the database (e.g., UDM/UDR) may be configured to accept subscription for a notification of change of the correlation of the EAS ID with the group ID.

According to certain embodiments, an EASDF may be configured to accept the single instruction for the ad-hoc group to build and/or send the DNS response with the selected EAS ID from a buffered DNS request via DNS context request from the SMF. The EASDF may build and/or send the DNS response with selected or signaled EAS ID based on the buffered DNS request as instructed by the SMF. In an embodiment, the EASDF may send a DNS reply to the UE with the EAS IP address provided by the SMF, without forwarding the DNS query to the DNS Server.

To address the possible situation where two UEs of the same ad-hoc group might send their DNS queries nearly simultaneously towards their SMF, the database (e.g., UDM/UDR) may be configured to evaluate a new creation, deletion or modification of the correlation of an EAS ID with a group ID in order to avoid overwriting the initially stored EAS ID. In this embodiment, the database may be configured to reject and/or respond the creation, deletion or modification of the correlation of the EAS ID with the group ID by sending the stored EAS ID towards the requestor. The SMF may be configured to accept the response to the creation of the correlation of the EAS ID with the group ID from the database with an EAS ID that is different from the EAS ID signaled from the SMF to the database. The SMF may evaluate the EAS ID received from the database and can re-select and re-configure DNAI/uplink (UL) classifier (CL) UPF and PSA UPF before instructing the EASDF to reply with DNS response towards the UE.

In some embodiments, the database (e.g., UDM/UDR) may be configured to evaluate new creation/deletion/modification of the correlation of a EAS ID with group ID in order to allow overwriting the initially stored EAS ID if higher priority instance(s), such as AF, PCF, NEF and/or SMF instructed by a higher layer function, signals a request to overwrite the existing content of the binding. If the evaluation determines that the overwriting is authorized, then the database may accept the deletion or modification of the correlation of the EAS ID with the group ID and acknowledge with an acceptance message towards the requestor.

For the implementation of the creation/deletion/modification of the binding at the UDM, some embodiments may re-use the existing Nudm_UECM_Registration request to carry binding information. Alternatively, in an embodiment, a new group specific service may be introduced to carry the binding information.

In certain embodiments, in order for the SMF to instruct the EASDF to match the DNS query of any of the UEs being member of the group identified by the group ID, the group ID and the associated IP addresses of the UE's under the control of the SMF may be added to the Neasdf_DNSContext_Create request and Neasdf_DNSContext_Update request. However, alternatively, the existing capability of baseline DNS patterns may be re-used for the same purpose.

Furthermore, optionally in addition to the EAS ID being bound with the group ID, the PDU session anchor (PSA) UPF/UL CL UPF may be added to the binding of the EAS ID and group ID.

FIG. 1 illustrates an example signaling diagram depicting EAS assignment for ad-hoc groups of member UEs with multiple SMF sets, according to one embodiment. In the example of FIG. 1, two UEs, UE1 and UE2 are included as ad-hoc group members. However, this is just one example and any number of UEs may be included in an ad-hoc group. As illustrated in the example of FIG. 1, at 110, the SMFs (SMF1 and/or SMF2) may subscribe to group notifications and the SMFs may be informed about a new attribute indicating "common EAS required" for the ad-hoc group of UEs. For instance, the SMFs may be notified via Nudm_SDM_NotificationNotify message. When the SMFs serve a PDU session associated with a "group for common EAS" indication, the SMFs may subscribe onto the data base, e.g. UDM/UDR, for the mapping between the (group ID, FQDN) and an EAS instance. If no such mapping exists yet and the SMF detects a UE request targeting the FQDN from a UE member of the "group for common EAS", then the SMF may determine to act as initial SMF for the group.

As further illustrated in the example of FIG. 1, at 120, the initial SMF1 may receive a DNS context notify containing the EAS ID (e.g., EAS IP address) from the EASDF1 for an initial DNS response about a FQDN associated with a "group for common EAS." After receiving the DNS context notify, at 125, the initial SMF1 may store the binding between the FQDN, the EAS ID reported by the EASDF, and the group ID to which the UE belongs, in its local database and/or an external database, e.g., the UDM/UDR. In addition, the SMF1 may provide its SMF ID (and/or SMF set ID) to the external database. In an embodiment, the SMF1 may instruct the EASDF1 to send the buffered DNS response with the EAS ID towards the first UE (e.g., UE1) of the group.

As illustrated in the example of FIG. 1, at 135, the initial SMF1 may inform its associated EASDFs for each UE of the group (for each IP address of the UEs being member of the group) about the assigned/selected EAS ID and the FQDN, and may instruct them to match DNS queries for the FQDN for that group ID (the EASDF may answer to the DNS requests from these UE(s) with the EAS ID. However, it is to be noted that UPF relocation may be needed before sending the DNS response) and to report the receipt of a DNS query sent by a UE of the corresponding group.

The SMF(s) (here initial SMF1) can ensure that the DNS requests targeting the same FQDN from their UE provide, as output, the same EAS as received in the mapping notification. This may be done by instructing the EASDF to answer to the DNS requests from UE(s) members of the ad-hoc group and target the FQDN with the same EAS ID.

In one embodiment, the SMF may instruct the EASDF to answer to the DNS requests from UE(s) members by sending a DNS Handling Rule targeting a DNS message type=DNS Query to the FQDN, and associated with following actions: (1) answer to the DNS requests from UE(s) members of the group and targeting the FQDN with the EAS ID and (2) possibly notify the SMF. In a further embodiment, the SMF may instruct the EASDF to answer to the DNS requests from UE(s) members by sending a DNS Handling Rule targeting a DNS message type=DNS Query to the FQDN, and associated with following action: (1) notify the SMF. As triggered by the notification, the SMF may send a new DNS Handling Rule (associated with the EASDF notification) instructing the EASDF to (1) discard the DNS request and (2) to send a DNS response containing the EAS ID to the UE.

As illustrated at 135 in the example of FIG. 1, the SMF may generate the DNS response including the EAS IP address and may instruct the EASDF to forward the DNS response to the UE.

In certain embodiments, the database, e.g. UDM/UDR, at 130, may notify the binding/correlation information to the SMFs that had subscribed to be notified about any change of this binding information (such as creation of binding between FQDN, EAS ID and Group ID, and removal of the binding between FQDN, EAS ID and Group ID). Then, the SMFs that are notified by the UDM/UDR may inform their associated EASDFs, in the same way as the initial SMF has.

According to an embodiment, upon receipt of the DNS query from a UE, the EASDF may create a DNS response for the UE(s) with the EAS ID, and may report this to the SMF and the SMF may select the DNAI/UL CL UPF and local PSA UPF for the EAS ID assigned to the group ID.

It is noted that FIG. 1 is provided as one example embodiment. However, certain embodiments are not limited to this example, and further examples or modifications are possible as discussed elsewhere herein.

Figure 2:
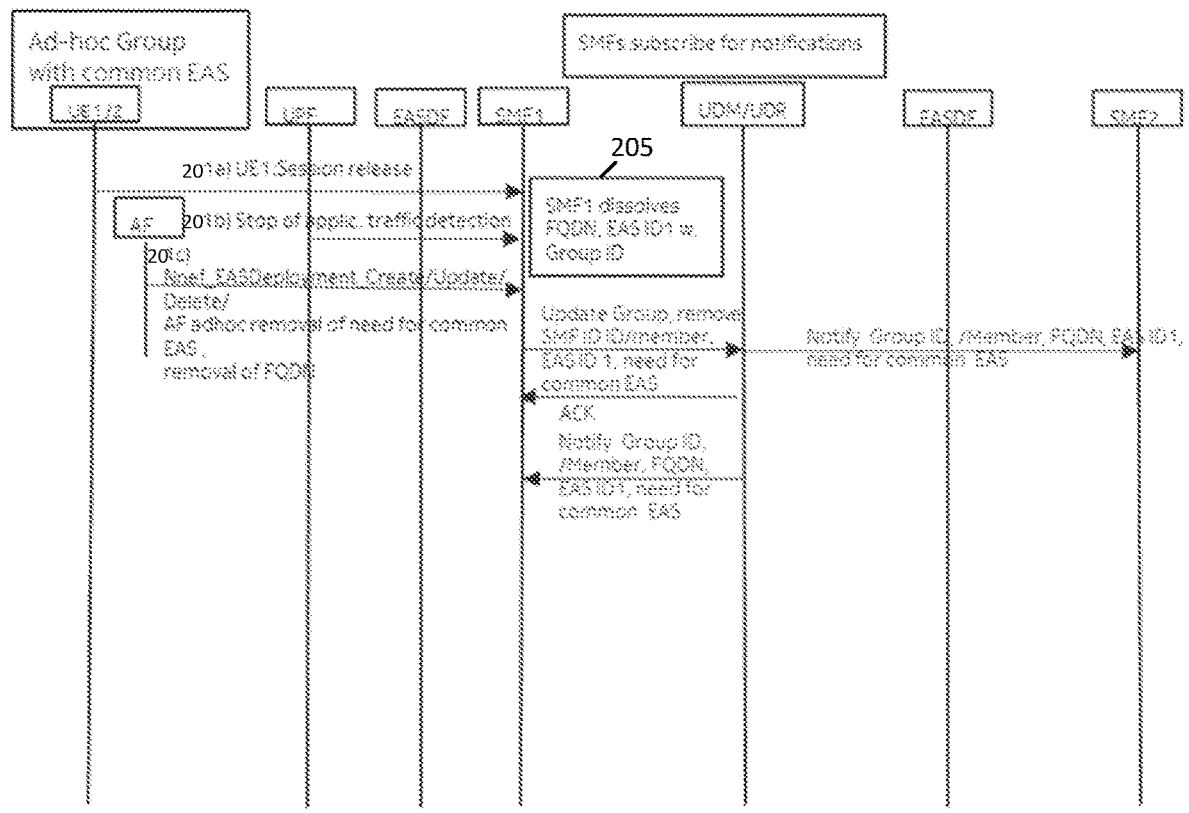
FIG. 2 illustrates an example signaling diagram, according to an embodiment.

FIG. 2 illustrates an example signaling diagram depicting the release of the binding between an EAS ID, FQDN and group ID, according to certain embodiments. As illustrated in the example of FIG. 2, at 201a, when the traffic of a specific application or the PDU session is terminated for a UE that was assigned to the EAS ID of the group, the SMF1 responsible for the PDU session of the UE may check whether it is the last PDU session of the group of UEs. If it is the least PDU session, then the SMF1 may, at 205, remove the binding and inform the local and/or external database(s) about the removal of the SMF ID (and/or SMF set ID). When SMF set functionality is supported, any SMF instance of the SMF set can remove the binding (e.g., if the SMF instance created the binding has failed meanwhile).

In a further embodiment, as illustrated at 201b, the SMF may request the UPF to notify the SMF when "stop" of the application traffic associated with the FQDN is detected for the UEs being members of the group. Upon receipt of such a stop notification, the SMF may check whether it is the last flow of that PDU session and may, at 205, remove its binding and inform the local and/or external database(s) about the removal of the SMF ID (and/or SMF set ID) as discussed above.

In yet a further embodiment, as illustrated at 201c, the SMF may check, upon receipt of Nnef_EASDeployment_Create/Update/Delete message, whether for that ad-hoc group the need for common EAS is removed or the FQDN is removed. If so, the SMF may remove its binding at 205, and may inform the local and/or external database(s) about the removal of its SMF ID (and/or SMF set ID). When SMF set functionality is supported, any SMF instance of the SMF set can remove the binding (e.g., if the SMF instance created the binding has failed meanwhile).

Upon receipt of binding release at the UDM/UDR, the UDM/UDR may check whether all of the SMFs (sets) reported to the UDM/UDR that they released their binding. If so, the UDM/UDR may notify all of the SMFs (sets) about the global release of the bindings, and the SMFs (sets) no longer apply the ad-group handing with common EAS.

Figure 3:
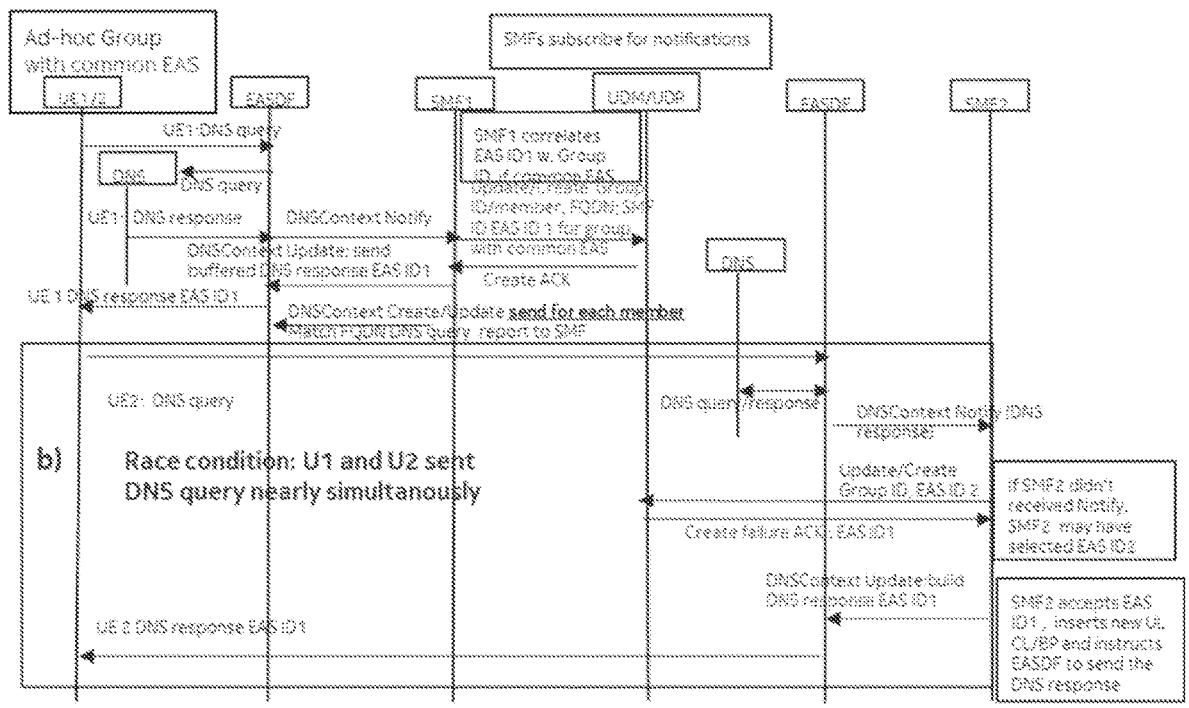
FIG. 3 illustrates an example signaling diagram, according to an embodiment.

FIG. 3 illustrates an example signaling diagram depicting a race condition in the assignment of EAS for ad-hoc groups of member UEs, according to an embodiment. More specifically, FIG. 3 illustrates an example in which two UEs of the same group, which are referred to as U1 and U2, may send their DNS queries nearly simultaneously towards their SMF (set). For this kind of race condition, where one of the involved SMFs may have not been received yet, the above-mentioned binding information between group ID and the already allocated EAS ID from the database, the functionality associated with the database (e.g., UDM/UDR) may be able to deny the binding to another EAS ID 2 possibly being sent by the second or third (etc.) SMF (set). In this case, the database (e.g., UDM/UDR) may return the already stored EAS ID 1 back to the second SMF (set).

The example scenario of FIG. 3 depicts a case where the participating SMF are handled as entities that are on an equal footing with each other. However, there may be cases where there might be entities that are on a higher hierarchical level than the SMFs being on equal footing as mentioned above.

Furthermore, there might be cases of scenarios different from the case described in the race conditions described above with respect to FIG. 3, where for instance an entity in a higher hierarchical level like the PCF/NEF, the AF, and/or any SMF with some higher priority due to instructions from higher layer entities, may want to overrule the selection functionality for the EAS ID already stored in the database (e.g., UDM/UDR). For such a case, according to some embodiments, those priority entities may be able to send an indication or request to the database to overrule the content of the database with the content sent in the signalling from the higher level entity to the database.

Figure 4:
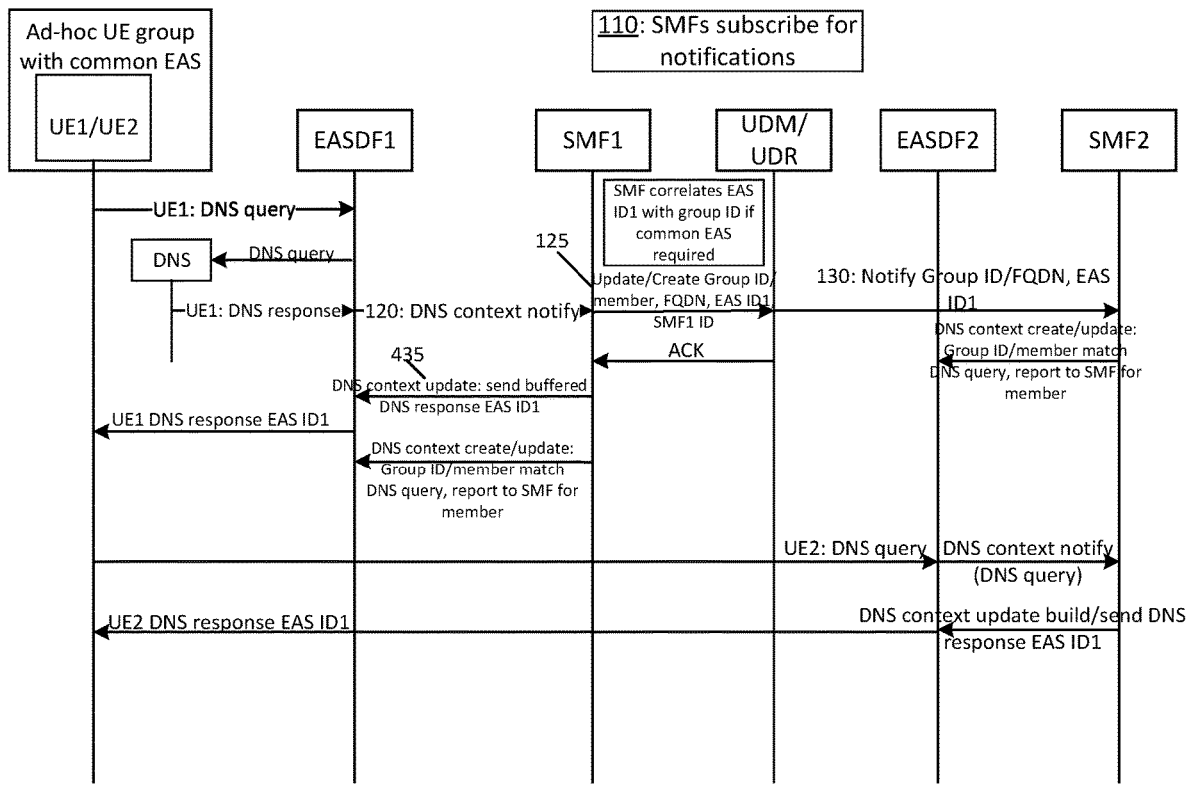
FIG. 4 illustrates an example signaling diagram, according to an embodiment.

FIG. 4 illustrates an example signaling diagram depicting EAS assignment for ad-hoc groups of member UEs with a single DNS context for the group, according to one embodiment. The example of FIG. 4 may be similar to that of FIG. 1, however, in the example of FIG. 4, the SMF may create a single DNS context for the group of UEs in the EASDF and provide the UE IP addresses of the group members. This may provide a more efficient sending of instruction from the SMF to EASDF, instead of multiple instructions for each UE of the ad-hoc group.

As illustrated in the example of FIG. 4, after selecting the EAS ID from DNS context notify (DNS response with potentially multiple EAS IP addresses) for the first UE of the group at the SMF and after receiving the UDM response for binding between EAS ID/FQDN/Group ID, at 435, the SMF may create a single DNS context for the group of UEs and provide the UE IP addresses of the group members it handles. Alternatively or additionally, the SMF may create a DNS context for each member of the group referring to a baseline DNS pattern created for the group. In this case, the baseline DNS pattern contains the instruction to build a DNS response with the IP address of the EAS selected for the group, from the buffered DNS request without sending the buffered DNS request to the DNS server.

It is noted that FIG. 4 is provided as one example embodiment. However, certain embodiments are not limited to this example, and further examples or modifications are possible as discussed elsewhere herein.

Figure 5:
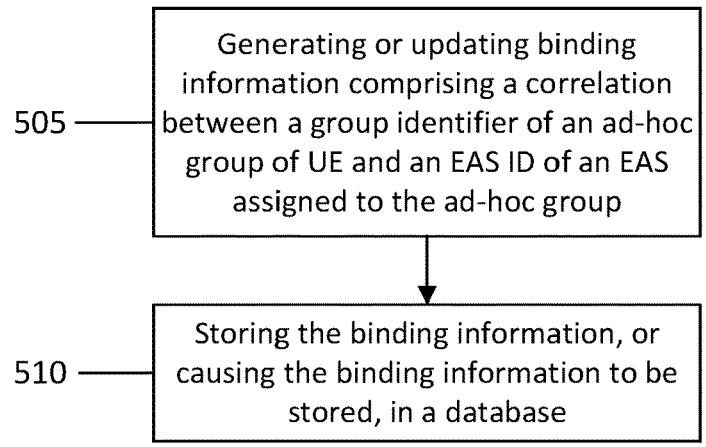
FIG. 5 illustrates an example flow chart of a method, according to an embodiment.

FIG. 5 illustrates an example flow diagram of a method for EAS assignment for an ad-hoc group of UE, according to one embodiment. The method can ensure a common EAS for the UEs in the ad-hoc group. In certain example embodiments, the flow diagram of FIG. 5 may be performed by a network entity or network node in a communications system, such as LTE, 5G, or 5G beyond (e.g., 6G). In some example embodiments, the network entity performing the method of FIG. 5 may include or be included in a base station, access node, node B, eNB, gNB, NG-RAN node, transmission-reception points (TRPs), high altitude platform stations (HAPS), relay station or the like. For example, according to certain embodiments, the entity performing the method of FIG. 5 may include a SMF, NF, AF, NEF, PCF, NRF such as those illustrated in the examples of FIGS. 1-4, or any other entity discussed herein. The SMF, AF, NF, PCF, NEF NRF or other entity performing the method of FIG. 5 may be capable of configuring and/or assigning the same EAS for an ad-hoc group of UEs.

As illustrated in the example of FIG. 5, the method may include, at 505, generating, updating, and/or deleting binding information comprising a correlation between a group identifier of an ad-hoc group of UE and an EAS ID of an EAS assigned to the ad-hoc group. In other words, the binding information may define the correlation between the group identifier of the ad-hoc group of UE and the EAS ID of the EAS assigned to the ad-hoc group. According to certain embodiments, the updating of the binding information may include modifying or deleting the binding information, for example.

In an embodiment, the EAS ID may be received from the EASDF in a DNS context notify message for an initial DNS response for a UE of the ad-hoc group. In some embodiments, the binding information may further include a FQDN or FQDN range for which the correlation between the group ID and the EAS ID applies, a SMF ID identifier for the SMF, and/or a SMF set ID for the SMF that is generating or updating the binding information. Additionally or alternatively, the binding information may include the PSA UPF or UL CL UPF.

In an embodiment, the method may include, at 510, storing, updating and/or deleting the binding information, or causing the binding information to be stored, in an internal or external database, such as UDM/UDR or NRF.

According to an embodiment, the method may include subscribing to the database (e.g., UDM/UDR or NRF) to receive notifications when there is a modification to the binding information or creation of new binding information. Then, in some embodiments, the method may include receiving, from the database, one or more notifications when there is a modification of the binding information.

In certain embodiments, the method may include providing, the EASDF, the association between the FQDN or FQDN range and the EAS ID, and instructing the EASDF to send a DNS response with the EAS ID to a UE in the ad-hoc group of UEs. More specifically, the DNS response including the EAS ID may be sent to a UE, in the ad-hoc group, which had sent a DNS query to the EASDF.

According to some embodiments, the method may include generating a DNS response including the EAS ID, and instructing the EASDF to send the generated DNS response including EAS ID to a UE in the ad-hoc group of UEs.

In certain embodiments, the method may include informing EASDF(s) associated with each UE that is a member of the ad-hoc group about the EAS ID of the EAS assigned to the ad-hoc group and the FQDN or FQDN range for which the correlation between the group ID of the ad-hoc group of UEs and the EAS ID of the EAS assigned to the ad-hoc group applies. In this embodiment, the method may then include instructing the EASDF(s) to answer a DNS query, from a UE that is a member of the ad-hoc group, with the EAS ID of the EAS assigned to the ad-hoc group. According to certain embodiments, the EAS ID may be an IP address or medium access control (MAC) address, for example.

According to some embodiments, the method may include instructing EASDF(s) associated with each UE that is a member of the ad-hoc group to report receipt of a DNS query from any of the UE that are a member of the ad-hoc group.

In an embodiment, the method may include generating a single DNS context for the ad-hoc group of UEs, and providing internet protocol (IP) addresses of the UE that are members of the ad-hoc group to EASDFs associated with each UE in the ad-hoc group. According to certain embodiments, the method may include removing, from the EASDF(s), a DNS context for the ad-hoc group of UEs.

According to an embodiment, the method may include generating a DNS context, for each UE in the ad-hoc group, referring to a baseline DNS pattern generated for the ad-hoc group. The baseline DNS pattern may include an instruction to build a DNS response with an address of the EAS assigned for the ad-hoc group.

According to some embodiments, the method may include accepting, from the database, a response to the generating of the binding information, where the response includes an EAS ID that is different from the EAS ID in the binding information initially stored in the database. In this embodiment, the method may further include evaluating the EAS ID received in the response to re-select at least one of a data network access identifier (DNAI), uplink classifier (UL CL) user plane function (UPF), or protocol data unit session anchor (PSA) user plane function before instructing the EASDFs associated with user equipment that are members of the ad-hoc group to send a DNS response toward the user equipment.

It is noted that FIG. 5 is provided as one example embodiment of a method or process. However, certain embodiments are not limited to this example, and further examples are possible as discussed elsewhere herein.

Figure 6:
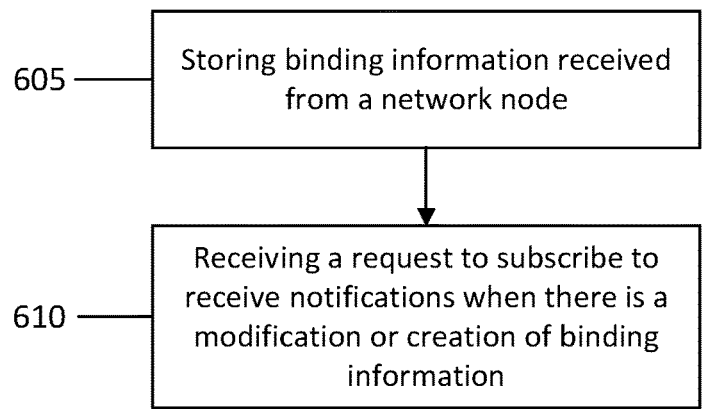
FIG. 6 illustrates an example flow chart of a method, according to an embodiment.

FIG. 6 illustrates an example flow diagram of a method for EAS assignment for an ad-hoc group of UE, according to one embodiment. In certain example embodiments, the flow diagram of FIG. 6 may be performed by a network entity or network node in a communications system, such as LTE or 5G NR. In some example embodiments, the network entity performing the method of FIG. 6 may include or be included in a base station, access node, node B, eNB, gNB, NG-RAN node, transmission-reception points (TRPs), high altitude platform stations (HAPS), relay station or the like. For example, according to certain embodiments, the entity performing the method of FIG. 6 may include a database or user data management node, such as the UDM and/or UDR illustrated in the examples of FIGS. 1-4, or NRF or any other entity discussed herein.

As illustrated in the example of FIG. 6, the method may include, at 605, storing binding information received from a network node, such as a SMF, AF, PCF, NEF, NRF or other network entity. In an embodiment, the binding information may include a correlation between a group ID of an ad-hoc group of UEs and an EAS ID of an EAS assigned to the ad-hoc group and the FQDN. It is noted that the EAS ID (e.g., IP address) is resolved and corresponds to the FQDN. According to some embodiments, the method may also include, at 610, receiving, from the network node or another network node, a request to subscribe to receive notifications when there is a modification or creation of the binding information.

According to some embodiments, the binding information may include one or more of a FQDN range for which the correlation applies, a SMF ID of the SMF, a SMF set ID for the SMF, a PSA UPF or UL CL UPF, for example.

In certain embodiments, the method may include receiving a request to modify the binding information from a requestor, such as another network node. The method may then include evaluating the request to modify the binding information to determine if overwriting of the EAS ID assigned to the ad-hoc group is authorized and, based on a result of the evaluation of the request, transmitting a response to the requestor. In some embodiments, the method may include updating and/or releasing the binding information.

In an embodiment, when the evaluating determines that the overwriting of the EAS ID assigned to the ad-hoc group is not authorized, the request is rejected and the response comprises the EAS identifier previously assigned to the ad-hoc group.

In an embodiment, when the request is received from a higher priority instance instructed by a higher layer function, the evaluating results in a determination that the overwriting of the EAS ID assigned to the ad-hoc group is authorized, and the method may include accepting the request to modify the binding information and sending the response including an acceptance message of the request to modify the binding information.

Figure 7:
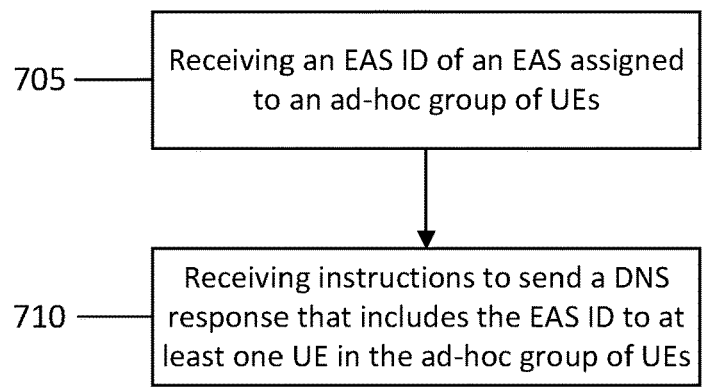
FIG. 7 illustrates an example flow chart of a method, according to an embodiment.

FIG. 7 illustrates an example flow diagram of a method for EAS assignment for an ad-hoc group of UE, according to one embodiment. In certain example embodiments, the flow diagram of FIG. 7 may be performed by a network entity or network node in a communications system, such as LTE or 5G NR. In some example embodiments, the network entity performing the method of FIG. 7 may include or be included in a base station, access node, node B, eNB, gNB, NG-RAN node, transmission-reception points (TRPs), high altitude platform stations (HAPS), relay station or the like. For example, according to certain embodiments, the entity performing the method of FIG. 7 may include an EASDF, such as the EASDF illustrated in the examples of FIGS. 1-4, or any other entity discussed herein.

As illustrated in the example of FIG. 7, the method may include, at 705, receiving, from a SMF or other network node, an association between a FQDN or FQDN range and an EAS ID of an EAS assigned to an ad-hoc group of UEs. The method may also include, at 710, receiving, from the SMF or other node, instructions to send a DNS response that includes the EAS ID to at least one UE in the ad-hoc group of UEs. For example, in certain embodiments, the EAS ID may be an IP address or MAC address.

In certain embodiments, the instructions may include instructions to generate the DNS response including the EAS ID, and then to send the DNS response to the at least one UE in the ad-hoc group of UEs.

However, according to some embodiments, the method may include receiving a generated DNS response including the EAS ID from the SMF or other network node, and the instructions may include instructions to send the generated DNS response including the EAS ID to a UE in the ad-hoc group of UEs.

In a further embodiment, the method may include receiving the EAS ID of the EAS assigned to the ad-hoc group along with a FQDN for which a correlation between a group ID of the ad-hoc group of UEs and the EAS ID applies, and receiving instructions to answer a DNS query from a UE that is a member of the ad-hoc group with EAS ID assigned to the ad-hoc group.

According to an embodiment, the method may include receiving instructions to report receipt of a DNS query for FQDN from any of the UE that are a member of the ad-hoc group to the SMF or other node.

It is noted that FIG. 7 is provided as one example embodiment of a method or process. However, certain embodiments are not limited to this example, and further examples are possible as discussed elsewhere herein.

Figure 8:
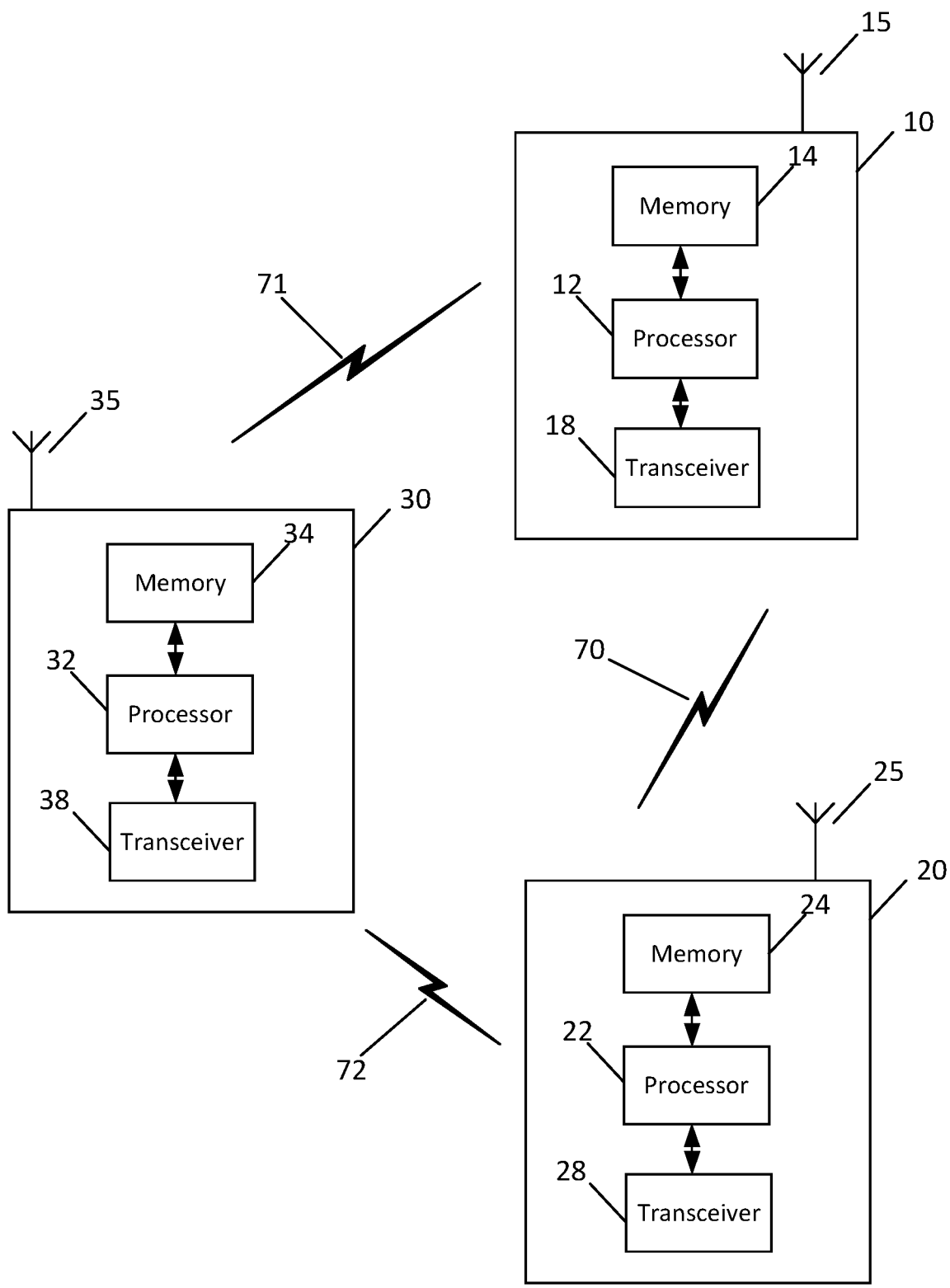
FIG. 8 illustrates an example block diagram of apparatuses, according to certain embodiments.

FIG. 8 illustrates an example of a system including apparatus 10, apparatus 20, and apparatus 30, according to certain embodiments. In an embodiment, apparatus 10 may be a node, host, or server in a communications network or serving such a network. For example, apparatus 10 may be a satellite, base station, a Node B, an evolved Node B (eNB), 5G Node B or access point, next generation Node B (NG-NB or gNB), transmission receive point (TRP), high altitude platform station (HAPS), integrated access and backhaul (IAB) node, and/or WLAN access point, associated with a radio access network, such as a LTE network, 5G or NR. In one example embodiment, apparatus 10 may represent a SMF, NF, AF, PCF, NEF, or other 5GC node, such as those illustrated in FIGS. 1-4.

It should be understood that, in some example embodiments, apparatus 10 may be comprised of an edge cloud server as a distributed computing system where the server and the radio node may be stand-alone apparatuses communicating with each other via a radio path or via a wired connection, or where they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 8.

As illustrated in the example of FIG. 8, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, or any other processing means, as examples.

While a single processor 12 is shown in FIG. 8, multiple processors may be utilized according to other example embodiments. For example, it should be understood that, in certain embodiments, apparatus 10 may include two or more processors that may form a multiprocessor system (e.g., in this case processor 12 may represent a multiprocessor) that may support multiprocessing. In some embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media, or other appropriate storing means. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and/or receive information. The transceiver 18 may include, for example, a plurality of radio interfaces that may be coupled to the antenna(s) 15, or may include any other appropriate transceiving means. In certain embodiments, the radio interfaces may correspond to a plurality of radio access technologies including one or more of LTE, 5G, WLAN, NB-IoT, Bluetooth, BT-LE, NFC, radio frequency identifier (RFID), ultrawideband (UWB), MulteFire, and/or radio access technologies. According to an example embodiment, the radio interface may include components, such as filters, converters (e.g., digital-to-analog converters and the like), mappers, a Fast Fourier Transform (FFT) module, and/or the like, e.g., to generate symbols or signals for transmission via one or more downlinks and to receive symbols (e.g., via an uplink).

As such, transceiver 18 may be configured to modulate information on to a carrier waveform for transmission by the antenna(s) 15 and to demodulate information received via the antenna(s) 15 for further processing by other elements of apparatus 10. In other example embodiments, transceiver 18 may be capable of transmitting and receiving signals or data directly. Additionally or alternatively, in some embodiments, apparatus 10 may include an input device and/or output device (I/O device), or an input/output means.

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a base station, access point, Node B, eNB, gNB, TRP, HAPS, IAB node, WLAN access point, or the like. In one example embodiment, apparatus 10 may be a SMF, NF, AF, PCF, NEF, NRF or other 5GC node. For example, in some embodiments, apparatus 10 may be configured to perform one or more of the processes depicted in any of the flow charts or signaling diagrams described herein, such as those illustrated in any of FIGS. 1-7. In some embodiments, as discussed herein, apparatus 10 may be configured to perform a procedure relating to the creation, update, and management of a common EAS assignment for an ad-hoc UE group, for example.

FIG. 8 illustrates an example of an apparatus 20 according to another embodiment. In an embodiment, apparatus 20 may be a node or element in a communications network or associated with such a network, such as a satellite, base station, a Node B, an evolved Node B (eNB), 5G Node B or access point, next generation Node B (NG-NB or gNB), transmission receive point (TRP), high altitude platform station (HAPS), integrated access and backhaul (IAB) node, and/or WLAN access point, associated with a radio access network, such as a LTE network, 5G or NR. In one example embodiment, apparatus 20 may represent a data storage or repository including a user subscription data storage, such as the UDM and/or UDR illustrated in FIGS. 1-3.

It should be understood that, in some example embodiments, apparatus 20 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 20 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 20 may include components or features not shown in FIG. 8.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 8.

As illustrated in the example of FIG. 8, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 8, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 or apparatus 30 via a wireless or wired communications link or interface 70 according to any radio access technology, such as NR.

According to some embodiments, processor 22 and memory 24 may be included in or may form a part of processing circuitry/means or control circuitry/means. In addition, in some embodiments, transceiver 28 may be included in or may form a part of transceiving circuitry or transceiving means.

As discussed above, according to some embodiments, apparatus 20 may be a data storage or repository including a user subscription data storage, such as the UDM and/or UDR, for example. According to certain embodiments, apparatus 20 may be controlled by memory 24 and processor 22 to perform the functions associated with example embodiments described herein. For example, in some embodiments, apparatus 20 may be configured to perform one or more of the processes depicted in any of the flow charts or signaling diagrams described herein, such as those illustrated in FIGS. 1-7. Thus, according to an embodiment, apparatus 20 may be configured to perform a procedure relating to the creation, management and/or update of common EAS assignment for an ad-hoc UE group as discussed elsewhere herein, for instance.

FIG. 8 illustrates an example of an apparatus 30 according to another example embodiment. In an example embodiment, apparatus 30 may be a node or element in a communications network or associated with such a network, such as a satellite, base station, a Node B, an evolved Node B (eNB), 5G Node B or access point, next generation Node B (NG-NB or gNB), and/or WLAN access point, associated with a radio access network, such as a LTE network, 5G or NR. According to one embodiment, apparatus 30 may be or may be included in a 5GC node, such as a EASDF, for example.

In some example embodiments, apparatus 30 may include one or more processors, one or more computer-readable storage medium (for example, memory, storage, or the like), one or more radio access components (for example, a modem, a transceiver, or the like), and/or a user interface. In some example embodiments, apparatus 30 may be configured to operate using one or more radio access technologies, such as GSM, LTE, LTE-A, NR, 5G, WLAN, WiFi, NB-IoT, MulteFire, and/or any other radio access technologies. It should be noted that one of ordinary skill in the art would understand that apparatus 30 may include components or features not shown in FIG. 8.

As illustrated in the example of FIG. 8, apparatus 30 may include or be coupled to a processor 32 for processing information and executing instructions or operations. Processor 32 may be any type of general or specific purpose processor. In fact, processor 32 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 32 is shown in FIG. 8, multiple processors may be utilized according to other example embodiments. For example, it should be understood that, in certain example embodiments, apparatus 30 may include two or more processors that may form a multiprocessor system (e.g., in this case processor 32 may represent a multiprocessor) that may support multiprocessing. In certain example embodiments, the multiprocessor system may be tightly coupled or loosely coupled (e.g., to form a computer cluster).

Processor 32 may perform functions associated with the operation of apparatus 30 including, as some examples, precoding of antenna gain/phase parameters, encoding and decoding of individual bits forming a communication message, formatting of information, and overall control of the apparatus 30, including processes related to management of communication resources.

Apparatus 30 may further include or be coupled to a memory 34 (internal or external), which may be coupled to processor 32, for storing information and instructions that may be executed by processor 32. Memory 34 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 34 can be comprised of any combination of random access memory (RAM), read only memory (ROM), static storage such as a magnetic or optical disk, hard disk drive (HDD), or any other type of non-transitory machine or computer readable media. The instructions stored in memory 34 may include program instructions or computer program code that, when executed by processor 32, enable the apparatus 30 to perform tasks as described herein.

In an example embodiment, apparatus 30 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 32 and/or apparatus 30.

In some example embodiments, apparatus 30 may also include or be coupled to one or more antennas 35 for receiving a downlink signal and for transmitting via an uplink from apparatus 30. Apparatus 30 may further include a transceiver 38 configured to transmit and receive information. The transceiver 38 may also include a radio interface (e.g., a modem) coupled to the antenna 35. The radio interface may correspond to a plurality of radio access technologies including one or more of GSM, LTE, LTE-A, 5G, NR, WLAN, NB-IoT, BT-LE, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 38 may be configured to modulate information on to a carrier waveform for transmission by the antenna(s) 35 and demodulate information received via the antenna(s) 35 for further processing by other elements of apparatus 30. In other example embodiments, transceiver 38 may be capable of transmitting and receiving signals or data directly. Additionally or alternatively, in some example embodiments, apparatus 30 may include an input and/or output device (I/O device). In certain example embodiments, apparatus 30 may further include a user interface, such as a graphical user interface or touchscreen.

In an example embodiment, memory 34 stores software modules that provide functionality when executed by processor 32. The modules may include, for example, an operating system that provides operating system functionality for apparatus 30. The memory may also store one or more functional modules, such as an application or program, to provide additional functionality for apparatus 30. The components of apparatus 30 may be implemented in hardware, or as any suitable combination of hardware and software. According to an example embodiment, apparatus 30 may optionally be configured to communicate with apparatus 10 via a wireless or wired communications link 71 and/or to communicate with apparatus 20 via a wireless or wired communications link 72, according to any radio access technology, such as NR.

According to some example embodiments, processor 32 and memory 34 may be included in or may form a part of processing circuitry or control circuitry. In addition, in some example embodiments, transceiver 38 may be included in or may form a part of transceiving circuitry.

As discussed above, according to some example embodiments, apparatus 30 may be a 5GC node, such as an EASDF, for example. According to certain example embodiments, apparatus 30 may be controlled by memory 34 and processor 32 to perform the functions associated with example embodiments described herein. For instance, in some example embodiments, apparatus 30 may be configured to perform one or more of the processes depicted in any of the diagrams or signaling flow diagrams described herein, such as those illustrated in FIGS. 1-6. According to certain example embodiments, apparatus 30 may be configured to perform a procedure relating to the creation, management and/or update of common EAS assignment for an ad-hoc UE group, for instance.

In some example embodiments, an apparatus (e.g., apparatus 10 and/or apparatus 20 and/or apparatus 30) may include means for performing one or more methods, processes, and/or procedures, or any of the variants discussed herein. Examples of the means may include one or more processors, memory, controllers, transmitters, receivers, sensors, circuits, and/or computer program code for causing the performance of any of the operations discussed herein.

In view of the foregoing, certain example embodiments provide several technological improvements, enhancements, and/or advantages over existing technological processes and constitute an improvement at least to the technological field of wireless network control and/or management. For example, as discussed in detail above, certain example embodiments can provide systems and/or methods for EAS assignment for an ad-hoc group of UEs in a manner that ensures the same EAS is assigned to the UEs in the same ad-hoc group. For example, some embodiments can make use of one single message sent to the EASDF from the SMF that is valid for the group thereby reducing the number of messages sent by the SMF. As such, some example embodiments can provide improved network efficiency, for example by reducing signaling, latency and/or power consumption. Accordingly, the use of certain example embodiments results in improved functioning of communications networks and their nodes, such as base stations, eNBs, gNBs, 5GC nodes, and/or IoT devices, UEs or mobile stations, or other network nodes or devices.

In some example embodiments, the functionality of any of the methods, processes, signaling diagrams, algorithms or flow charts described herein may be implemented by software and/or computer program code or portions of code stored in memory or other computer readable or tangible media, and may be executed by a processor.

In some example embodiments, an apparatus may include or be associated with at least one software application, module, unit or entity configured as arithmetic operation(s), or as a program or portions of programs (including an added or updated software routine), which may be executed by at least one operation processor or controller. Programs, also called program products or computer programs, including software routines, applets and macros, may be stored in any apparatus-readable data storage medium and may include program instructions to perform particular tasks. A computer program product may include one or more computer-executable components which, when the program is run, are configured to carry out some example embodiments. The one or more computer-executable components may be at least one software code or portions of code. Modifications and configurations needed for implementing the functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality of example embodiments may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, some functionality of example embodiments may be implemented as a signal that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Some embodiments described herein may use the conjunction "and/or". It should be noted that, when used, the term "and/or" is intended to include either of the alternatives or both of the alternatives, depending on the example embodiment or implementation. In other words, "and/or" can refer to one or the other or both, or any one or more or all, of the things or options in connection with which the conjunction is used.

Example embodiments described herein may apply to both singular and plural implementations, regardless of whether singular or plural language is used in connection with describing certain embodiments. For example, an embodiment that describes operations of a single network node may also apply to example embodiments that include multiple instances of the network node, and vice versa.

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

PARTIAL GLOSSARY

5GC 5G Core Network
AF Application Function
DN Data Network
DNAI DN Access Identifier
DNN Data Network Name
DNS Domain Name Service
EAS Edge Application Server
EASDF EAServer Discovery Function
FQDN Fully Qualified Domain Name
NEF Network Exposure Function
NF Network Function
NRF Network Discovery Function
PCF Policy Control Function
PSA PDU Session Anchor
QoS Quality of Service
SMF Session Management Function
UDM Unified Data management
UDR Unified Data Repository
UL Uplink
UL CL Uplink Classifier
UPF User Plane Function.

We claim:

1. An apparatus, comprising:
   at least one processor; and
   at least one memory comprising computer program code, the at least one memory and computer program code configured, with the at least one processor, to cause the apparatus at least to perform at least one of:
   generate, update, or delete binding information comprising a correlation between a group identifier of an ad-hoc group of user equipment (UE) and a first edge application server (EAS) identifier assigned to the ad-hoc group;
   store the binding information in a database; and
   subscribe to the database to receive notifications when there is a modification of the binding information,
   wherein the binding information further comprises at least one of: a fully qualified domain name (FQDN) or FQDN range for which the correlation applies, a session management function identifier for the apparatus, a session management function set identifier for the apparatus, a protocol data unit (PDU) session anchor (PSA) user plane function (UPF) or uplink (UL) classifier (CL) user plane function (UPF).

2. The apparatus of claim 1, wherein the database comprises at least one of unified data management (UDM), a unified data repository (UDR), or a network repository function (NRF).

3. The apparatus of claim 1, wherein the at least one memory and computer program code are configured, with the at least one processor, to cause the apparatus at least to:
   receive, from the database, one or more notifications when there is a modification of the binding information.

4. The apparatus of claim 1, wherein the at least one memory and computer program code are configured, with the at least one processor, to cause the apparatus at least to:
   provide, to an edge application server discovery function (EASDF), an association between a fully qualified domain name (FQDN) or FQDN range and a second edge application server (EAS) identifier; and
   instruct the edge application server discovery function (EASDF) to send a domain name system (DNS) response comprising the second edge application server (EAS) identifier to a user equipment in the ad-hoc group of user equipment (UE).

5. The apparatus of claim 1, wherein the at least one memory and computer program code are configured, with the at least one processor, to cause the apparatus at least to:
   generate a domain name system (DNS) response comprising the first edge application server (EAS) identifier; and
   instruct an edge application server discovery function (EASDF) to send the generated domain name system (DNS) response comprising the first edge application server (EAS) identifier to a user equipment in the ad-hoc group of user equipment (UE).

6. The apparatus of claim 1, wherein the at least one memory and computer program code are configured, with the at least one processor, to cause the apparatus at least to:

inform edge application server discovery functions (EASDFs) associated with each user equipment (UE) that is a member of the ad-hoc group about the first edge application server (EAS) identifier assigned to the ad-hoc group and the fully qualified domain name (FQDN) or FQDN range for which the correlation applies; and instruct the edge application server discovery functions (EASDFs) to answer a domain name system (DNS) query from a user equipment that is a member of the ad-hoc group with the first edge application server (EAS) identifier assigned to the ad-hoc group.

7. The apparatus of claim 6, wherein the first edge application server (EAS) identifier is an internet protocol (IP) address or a medium access control (MAC) address.

8. The apparatus of claim 1, wherein the at least one memory and computer program code are configured, with the at least one processor, to cause the apparatus at least to:
instruct edge application server discovery functions (EASDFs) associated with each user equipment (UE) that is a member of the ad-hoc group to report receipt of a domain name system (DNS) query from any of the user equipment that are a member of the ad-hoc group to the apparatus.

9. The apparatus of claim 1, wherein the at least one memory and computer program code are configured, with the at least one processor, to cause the apparatus at least to:
generate a single domain name system (DNS) context for the ad-hoc group of user equipment; and
provide internet protocol (IP) addresses of the user equipment that are members of the ad-hoc group to edge application server discovery functions (EASDFs) associated with each user equipment (UE) in the ad-hoc group.

10. The apparatus of claim 4, wherein the at least one memory and computer program code are configured, with the at least one processor, to cause the apparatus at least to:
remove, from the edge application server discovery function (EASDF), a domain name system (DNS) context for the ad-hoc group of user equipment.

11. The apparatus of claim 1, wherein the at least one memory and computer program code are configured, with the at least one processor, to cause the apparatus at least to:
generate a domain name system (DNS) context for each user equipment in the ad-hoc group referring to a baseline domain name system (DNS) pattern generated for the ad-hoc group, wherein the baseline domain name system (DNS) pattern comprises an instruction to build a domain name system (DNS) response with an address of the edge application server (EAS) assigned for the ad-hoc group.

12. The apparatus of claim 1, wherein the at least one memory and computer program code are configured, with the at least one processor, to cause the apparatus at least to:
accept, from the database, a response to the generating of the binding information, the response comprising a second edge application server (EAS) identifier that is different from the first edge application server (EAS) identifier in the binding information stored in the database; and
evaluate the second edge application server (EAS) identifier received in the response to re-select at least one of a data network access identifier (DNAI), uplink classifier (UL CL) user plane function (UPF), or protocol data unit session anchor (PSA) user plane function before instructing edge application server discovery functions (EASDFs) associated with user equipment that are members of the ad-hoc group to send a domain name system (DNS) response toward the user equipment.

13. The apparatus of claim 1, wherein the apparatus comprises at least one of a session management function (SMF), application function (AF), policy control function (PCF), or network exposure function (NEF).

14. An apparatus, comprising:
at least one processor; and
at least one memory comprising computer program code,
the at least one memory and computer program code configured, with the at least one processor, to cause the apparatus at least to:
store binding information received from a network node, the binding information comprising a correlation between a group identifier of an ad-hoc group of user equipment (UE) and an edge application server (EAS) identifier assigned to the ad-hoc group and a fully qualified domain name (FQDN); and
receive, from the network node or another network node, a request to subscribe to receive notifications from the apparatus when there is a modification of the binding information,
wherein the binding information further comprises at least one of: a fully qualified domain name (FQDN) or FQDN range for which the correlation applies, a session management function identifier for the apparatus, a session management function set identifier for the apparatus, a protocol data unit (PDU) session anchor (PSA) user plane function (UPF) or uplink (UL) classifier (CL) user plane function (UPF).

15. The apparatus of claim 14, wherein the at least one memory and computer program code are configured, with the at least one processor, to cause the apparatus at least to:
receive a request to modify the binding information from said another network node;
evaluate the request to modify the binding information to determine if overwriting of the edge application server (EAS) identifier assigned to the ad-hoc group is authorized; and
based on the evaluation of the request, transmit a response to said another network node.

16. The apparatus of claim 15, wherein, when the evaluation determines that the overwriting of the edge application server (EAS) identifier assigned to the ad-hoc group is not authorized, the request is rejected and the response comprises the edge application server (EAS) identifier previously assigned to the ad-hoc group.

17. The apparatus of claim 15, wherein, when the request is received from a higher priority instance instructed by a higher layer function, the evaluation determines that the overwriting of the edge application server (EAS) identifier assigned to the ad-hoc group is authorized, and the at least one memory and computer program code are configured, with the at least one processor, to cause the apparatus at least to:
accept the request to modify the binding information, wherein the response comprise an acceptance message.

18. The apparatus of claim 14, wherein the at least one memory and computer program code are configured, with the at least one processor, to cause the apparatus at least to:
update and release the binding information.

19. The apparatus of claim 14, wherein the apparatus comprises at least one of unified data management (UDM), uniform data repository (UDR) or network repository function (NRF), and wherein the network node or said another network node comprises at least one of a session management function (SMF), application function (AF), policy control function (PCF), or network exposure function (NEF).

20. An apparatus, comprising:
at least one processor; and
at least one memory comprising computer program code,
the at least one memory and computer program code configured, with the at least one processor, to cause the apparatus at least to:
receive, from a session management function (SMF), an association between a fully qualified domain name (FQDN) or FQDN range and an edge application server (EAS) identifier of an edge application server assigned to an ad-hoc group of user equipment (UE); and
receive, from the session management function (SMF), instructions to send a domain name system (DNS) response comprising the edge application server (EAS) identifier to at least one user equipment in the ad-hoc group of user equipment (UE).

21. The apparatus of claim 20, wherein the instructions further comprise instructions to generate the domain name system (DNS) response comprising the edge application server (EAS) identifier.

22. The apparatus of claim 20, wherein the edge application server (EAS) identifier comprises an internet protocol (IP) address or a medium access control (MAC) address.

23. The apparatus of claim 20, wherein the at least one memory and computer program code are configured, with the at least one processor, to cause the apparatus at least to:
receive a generated domain name system (DNS) response comprising the edge application server (EAS) identifier from the session management function (SMF), and wherein the instructions comprise instructions to send the generated domain name system (DNS) response comprising the edge application server (EAS) identifier to a user equipment in the ad-hoc group of user equipment (UE).

24. The apparatus of claim 20, wherein the at least one memory and computer program code are configured, with the at least one processor, to cause the apparatus at least to:
receive the edge application server (EAS) identifier assigned to the ad-hoc group along with a fully qualified domain name (FQDN) for which a correlation between a group identifier of the ad-hoc group of user equipment (UE) and the edge application server (EAS) identifier applies; and
receive instructions to answer a domain name system (DNS) query from a user equipment that is a member of the ad-hoc group with the edge application server (EAS) identifier assigned to the ad-hoc group.

25. The apparatus of claim 20, wherein the at least one memory and computer program code are configured, with the at least one processor, to cause the apparatus at least to:
receive instructions to report receipt of a domain name system (DNS) query from any of the user equipment that are a member of the ad-hoc group to the session management function (SMF).

26. The apparatus of claim 20, wherein the apparatus comprises an edge application server discovery function (EASDF).

* * * * *